US008915088B2

(12) United States Patent
Ajami et al.

(10) Patent No.: US 8,915,088 B2
(45) Date of Patent: Dec. 23, 2014

(54) FUEL CONTROL METHOD FOR STARTING A GAS TURBINE ENGINE

(75) Inventors: Andre M. Ajami, Spring Valley, CA (US); Kenneth W. Winston, San Diego, CA (US); Xiaolan Hu, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1076 days.

(21) Appl. No.: 12/813,627

(22) Filed: Jun. 11, 2010

(65) Prior Publication Data
US 2011/0302927 A1    Dec. 15, 2011

(51) Int. Cl.
F02C 7/22    (2006.01)
F02C 7/26    (2006.01)
F02C 9/00    (2006.01)
F02C 9/26    (2006.01)
F02C 9/28    (2006.01)

(52) U.S. Cl.
CPC . *F02C 7/26* (2013.01); *F02C 9/263* (2013.01); *F02C 9/28* (2013.01); F05D 2220/50 (2013.01); F05D 2260/85 (2013.01); F05D 2270/304 (2013.01); F05D 2270/303 (2013.01); F05D 2270/301 (2013.01)
USPC ............................. 60/778; 60/786; 60/39.13

(58) Field of Classification Search
USPC ................ 60/778, 39.13, 786, 790, 788, 776
See application file for complete search history.

(56) References Cited

U.S. PATENT DOCUMENTS

| | | | |
|---|---|---|---|
| 3,764,814 A | 10/1973 | Griffith | |
| 4,019,315 A | 4/1977 | Yannone et al. | |
| 4,456,830 A | 6/1984 | Cronin | |
| 4,748,804 A * | 6/1988 | Krukoski | 60/773 |
| 5,042,246 A * | 8/1991 | Moore et al. | 60/773 |
| 5,722,228 A | 3/1998 | Lampe et al. | |
| 5,877,606 A | 3/1999 | Nozari | |
| 6,142,418 A | 11/2000 | Weber et al. | |
| 6,362,590 B2 | 3/2002 | Nozari | |
| 6,735,951 B2 | 5/2004 | Thompson | |
| 6,777,822 B1 | 8/2004 | Suttie et al. | |
| 6,829,899 B2 | 12/2004 | Benham, Jr. et al. | |
| 6,836,086 B1 | 12/2004 | Goldberg et al. | |
| 7,331,169 B2 * | 2/2008 | Riley | 60/39.281 |
| 2002/0148229 A1 * | 10/2002 | Pont et al. | 60/776 |
| 2005/0097895 A1 * | 5/2005 | Kothnur et al. | 60/776 |
| 2007/0239633 A1 * | 10/2007 | Dietrich et al. | 706/15 |

* cited by examiner

*Primary Examiner* — Gerald L Sung
(74) *Attorney, Agent, or Firm* — Carlson, Gaskey & Olds, PC

(57) ABSTRACT

A method for controlling a flow of fuel to a starting gas turbine engine includes controlling the flow of fuel to the engine by controlling fuel pressure to the engine, and modulating the flow of fuel to the engine if engine exhaust gas temperature approaches a given exhaust gas temperature to lower the engine exhaust gas temperature below the given exhaust gas temperature.

18 Claims, 3 Drawing Sheets

FUEL CONTROL METHOD FOR STARTING A GAS TURBINE ENGINE

BACKGROUND OF THE INVENTION

The subject matter disclosed herein relates to controlling fuel flow to a gas turbine engine.

Fuel control of a gas turbine engine revolves around an understanding of the engine combustor and fuel metering characteristics, and ambient conditions, such as temperature and pressure, the engine encounters. Fuel metering can significantly affect the start reliability of a gas turbine engine, such as an auxiliary power unit ("APU"), especially at extreme altitudes and ambient temperatures.

Gas turbine engines may command fuel during starting to achieve a preset acceleration set point curve, whereby a control commands operation between predetermined fuel command maximum and minimum limits. Predetermined fuel command limits take into account a fuel nozzle spray pattern and combustor flame-out limits.

Standard practice is to meter fuel flow based on a speed sensor input signal to maintain a desired acceleration of the engine.

SUMMARY OF THE INVENTION

An example method for controlling a flow of fuel to a starting gas turbine engine includes controlling the flow of fuel to the engine by controlling fuel pressure to the engine, and modulating the flow of fuel to the engine if engine exhaust gas temperature approaches a given exhaust gas temperature to lower the engine exhaust gas temperature below the given exhaust gas temperature.

According to a further exemplar, a fuel control system for controlling fuel to a starting gas turbine engine, has a fuel line to the engine, a fuel pump, a fuel injector, a sensor sensing supply pressure of fuel to the fuel injector, a controller including instructions to control a flow of fuel to the engine by responding to a fuel pressure signal received from the fuel pressure sensor, and to modulate fuel flow to the engine if engine exhaust gas temperature exceeds a given exhaust gas temperature to lower said engine exhaust gas temperature below the given exhaust gas temperature.

Allowing the fuel to be metered based off of fuel pressure, as described herein, allows consistent and repeatable fuel flow to be delivered during starting of a gas turbine engine. The method provides improved precision of the fuel metering during low engine speed, where combustion instability is of concern, and also maintains exhaust gas temperatures within proper limits, resulting in reliable starting in higher altitude and lower temperature extremes.

These and other features of the present invention can be best understood from the following specification and drawings, the following of which is a brief description.

DETAILED DESCRIPTION OF THE PREFERRED EMBODIMENT

Figure 1:
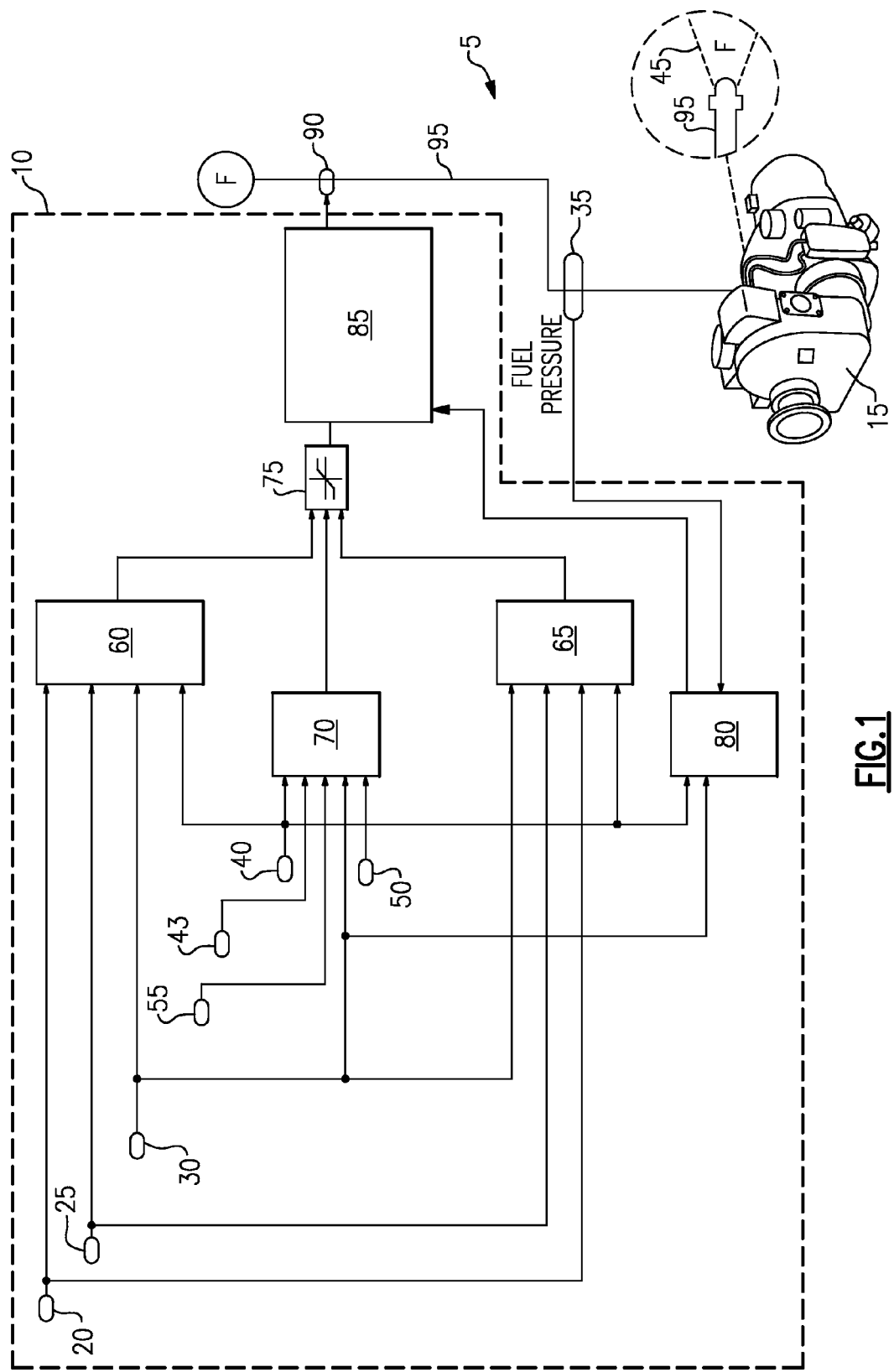
FIG. 1 shows a schematic flow chart of an engine and a fuel controller used to start a gas turbine engine.

Referring now to FIG. 1, a fuel control system 5 includes a controller 10, which can also be referred to as a low speed fuel command module, for providing a command to a fuel pump 90, which in turn delivers metered fuel to an engine 15, such as an APU for an aircraft (not shown) is shown. While the controller 10 may be used with an APU, it may also be used with other types of gas turbine engines.

The controller 10 uses a known root-theta correction factor 20 relating to temperature, and a known delta correction factor 25 relating to ambient pressure and an altitude look-up table 40. The controller 10 takes in information from an engine speed sensor 30, a fuel pressure sensor 35 such as a pressure transducer, an inlet air pressure sensor 43, a valid EGT (exhaust gas temperature) sensor 50 and a last fuel command input 55. The EGT sensor 50 monitors the exhaust gas temperature for the engine 15. The last fuel command input 55 provides past fuel commands of the controller 10, using one or more memory elements, so as to provide a basis for each succeeding command. The altitude look-up table 40 provides parameters for use at different altitudes that are chosen for use by determining altitude calculated from data from the inlet air pressure sensor 43, to determine operating limits. As is known in the art, the controller 10 includes instruction sets to carry out the limitations disclosed herein. The controller 10 may be implemented using one or more microcontrollers, microprocessors, and/or other circuitry capable of executing the instruction sets tangibly embodied in one or more memory elements. It will be understood that the elements of controller 10 described and depicted herein represent a subset of the total functionality that may be incorporated within the controller 10, for instance, modules related to issuing fuel commands at low speeds of engine 15.

The controller 10 also has a maximum fuel limit module 60 having a set of instructions, a minimum fuel limit module 65 having a set of instructions, an EGT PI module 70 (Proportional Integral control in which the module compares error between a set point and actual data and determines a correction factor based upon rate of change) having a set of instructions, a clipping module 75 having a set of instructions, a fuel pressure control PI module 80 having a set of instructions and a latch module 85 having a set of instructions.

The latch module 85 determines which of the EGT PI module 70 or fuel pressure control PI module 80 control the fuel pump 90 as will be discussed hereinbelow. The controller 10 may initially issue fuel commands using the fuel pressure control PI module 80 and continue until the EGT PI module 70 output is less than the fuel pressure control PI module 80 output, at which point the latch module 85 switches control to the EGT PI module 70 where control remains. The latch module 85 can switch control from either of EGT PI module 70 or the fuel pressure control PI module 80 to a separate controller/module (not shown) if the engine speed from the engine speed sensor 30 exceeds a given percentage of rated speed (% N, see FIG. 2) as a speed threshold. The clipping module 75 takes input from the EGT PI module 70, the maximum fuel limit module 60, and the minimum fuel module 65. If fuel flow is or is about to exceed the maximum fuel limit as determined by the maximum fuel limit module 60, the clipping module 75 clips a signal from the EGT PI module 70 to disallow more than the maximum of fuel to be commanded. Similarly, if fuel flow is or is about to go below the minimum fuel limit as determined by the minimum fuel limit module 65, the clipping module 75 will clip a signal from the EGT PI module 70 to disallow any fuel flow below the minimum amount of fuel.

The maximum fuel limit module 60 receives input from the root-theta correction factor 20, the delta correction factor 25, the engine speed sensor 30 and the altitude look-up table 40. The maximum fuel limit module 60 correlates the maximum fuel flow permissible to the engine to minimize a probability that the engine 15 would be given too much fuel given the correction factors 20 and 25 at a given altitude and engine speed. Too much fuel may cause the mix of fuel delivered to the engine 15 to become too rich or flood the engine 15 which may cause engine flameout. Moreover, if the engine 15 receives fuel above the maximum fuel limit, the engine 15 may not be able to withstand the heat caused by the burning of the excess fuel and damage components (not shown) therein.

Similarly the minimum fuel limit module 65 receives input from the root-theta correction factor 20, the delta correction factor 25, the engine speed sensor 30 and the altitude look-up table 40. The minimum fuel limit module 65 correlates the minimum fuel flow permissible to the engine 15 to minimize a probability that the engine 15 would be given too little fuel given the inlet air pressure 43, engine correction factors 20 and 25 at a given altitude and engine speed 30. Too little fuel may cause the engine 15 to be too lean which may cause engine flameout.

The EGT PI control module 70 receives input from the engine speed sensor 30, the EGT sensor 50, the altitude look-up tables 40, the inlet air pressure sensor 43 and the last fuel command input 55. The inlet air pressure sensor 43 allows the EGT PI control module 70 to look up from the altitude look-up tables 40 in which engine speed and inlet air pressure are used to optimize control gains and thereby provide responsive and stable control of EGT. This module 70 is only used if the fuel pressure control module 80 causes EGT to approach the setpoint of a given temperature for EGT PI control.

The fuel pressure control module 80 receives input from the engine speed sensor 30, fuel pressure sensor 35, and altitude look-up tables 40. The fuel pressure control module 80 controls fuel injector pressure as dictated by the appropriate altitude look-up tables 40 by modulating fuel pressure to the engine 15 via latch module 85 and fuel control/pump 90 that directs fuel F through line 95 to the engine 15 via fuel injectors 45. Though a fuel injector is described herein, other fuel delivery apparatus are contemplated herein.

Figure 2:
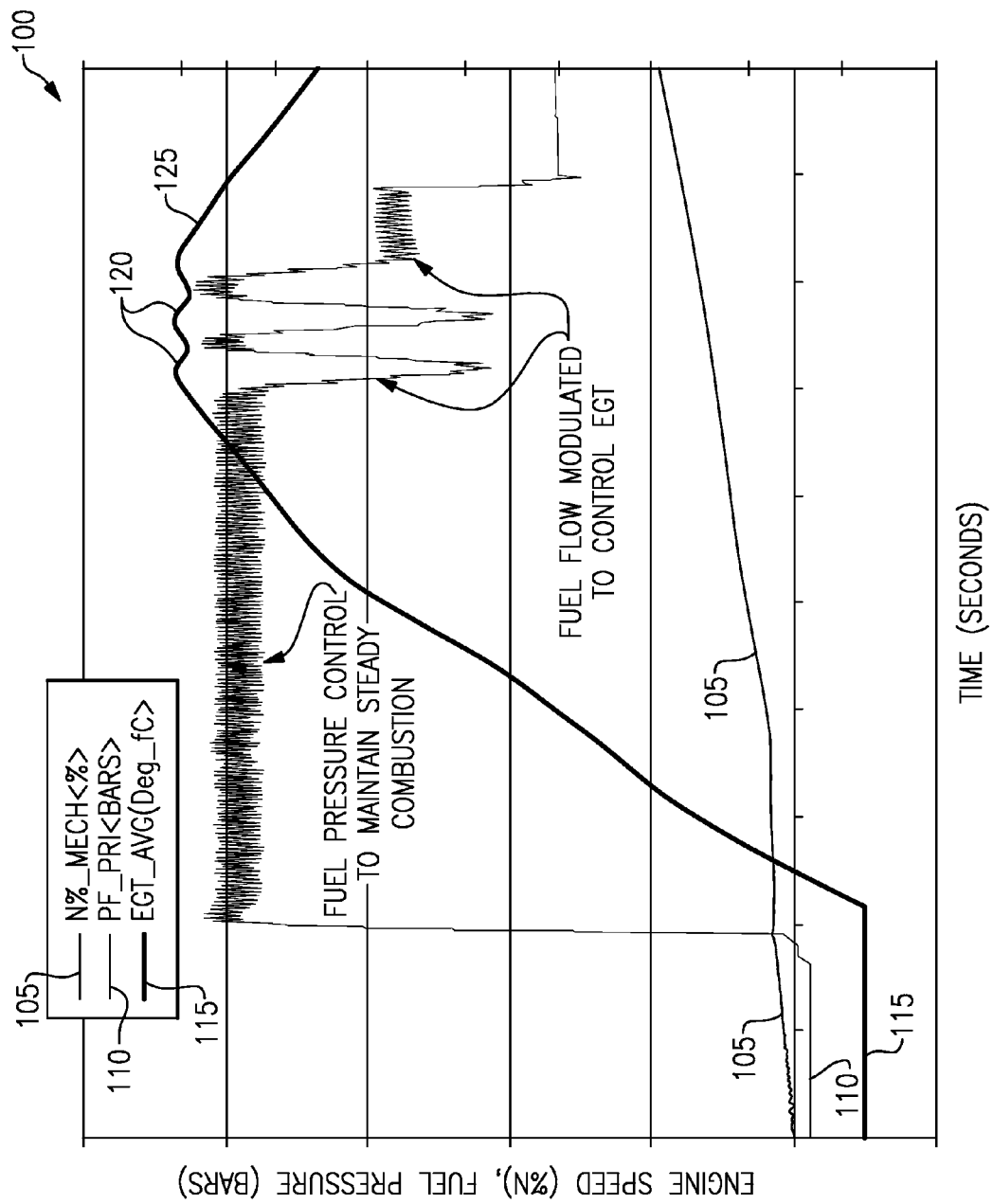
FIG. 2 shows a graphical view of a start-up of a gas turbine engine as shown in FIG. 1.

Referring now to FIG. 2, a graph 100 shows an example sequence of starting the engine 15 of FIG. 1 using controller 10 according to the teachings herein. The graph 100 shows, on its left Y-axis, both engine speed (% N) and fuel pressure in bars. Line 105 represents engine speed as measured by engine speed sensor 30 of FIG. 1. Line 110 shows the pressure of fuel delivered to the engine fuel injectors 45 of FIG. 1 over time as measure by fuel pressure sensor 35 of FIG. 1. Line 115 shows the engine gas temperature ("EGT") as the engine 15 accelerates over time as measured by EGT sensor 50 of FIG. 1.

In the example of FIG. 2 at about 10-15 seconds after the ignition process is started, the engine 15 rotates slowly. As indicated by lines 110 and 105, the fuel injector 45 pressure is very low until the engine speed reaches a threshold value, and in response thereto, fuel pressure is rapidly increased to a controlled level to maintain steady combustion. Because the engine 15 is started at ambient temperature at high altitude, in this example about 42,000 feet (12.8 km), the EGT may be very low, at about −20° C. After the fuel pressure is increased to maintain steady combustion, EGT and engine speed increase steadily as the EGT begins to approach the EGT control limit. In one embodiment, the EGT control limit establishes a given exhaust gas temperature set point of about 704° C. At this point, the latch module 85 of FIG. 1 recognizes that the EGT PI module 70 is requesting less fuel flow than the fuel pressure control PI module 80 and thereby removes control authority from the fuel pressure control PI module 80 and gives authority to the EGT PI module 70. The EGT PI module 70 then modulates fuel flow to the engine fuel injectors 45 as required to maintain EGT near the control limit (see FIG. 2 item 120). If the EGT PI control module 70 determines that fuel pressure to be fed to the engine 15 is too high, the fuel pressure modulates (see FIG. 2) until an acceptable engine EGT is reached. If the EGT drops too quickly (see slopes 120) the fuel pressure is modulated by the EGT PI control module 70 until an acceptable pressure decrease is accompanied by an acceptable EGT decrease (see slope 125 of FIG. 2).

In response to the engine speed reaching about 30-35 percent of rotation speed N, control may be passed to other modules (not shown) of the controller 10 or to a separate speed controller (not shown) and operates as is known in the art.

Figure 3:
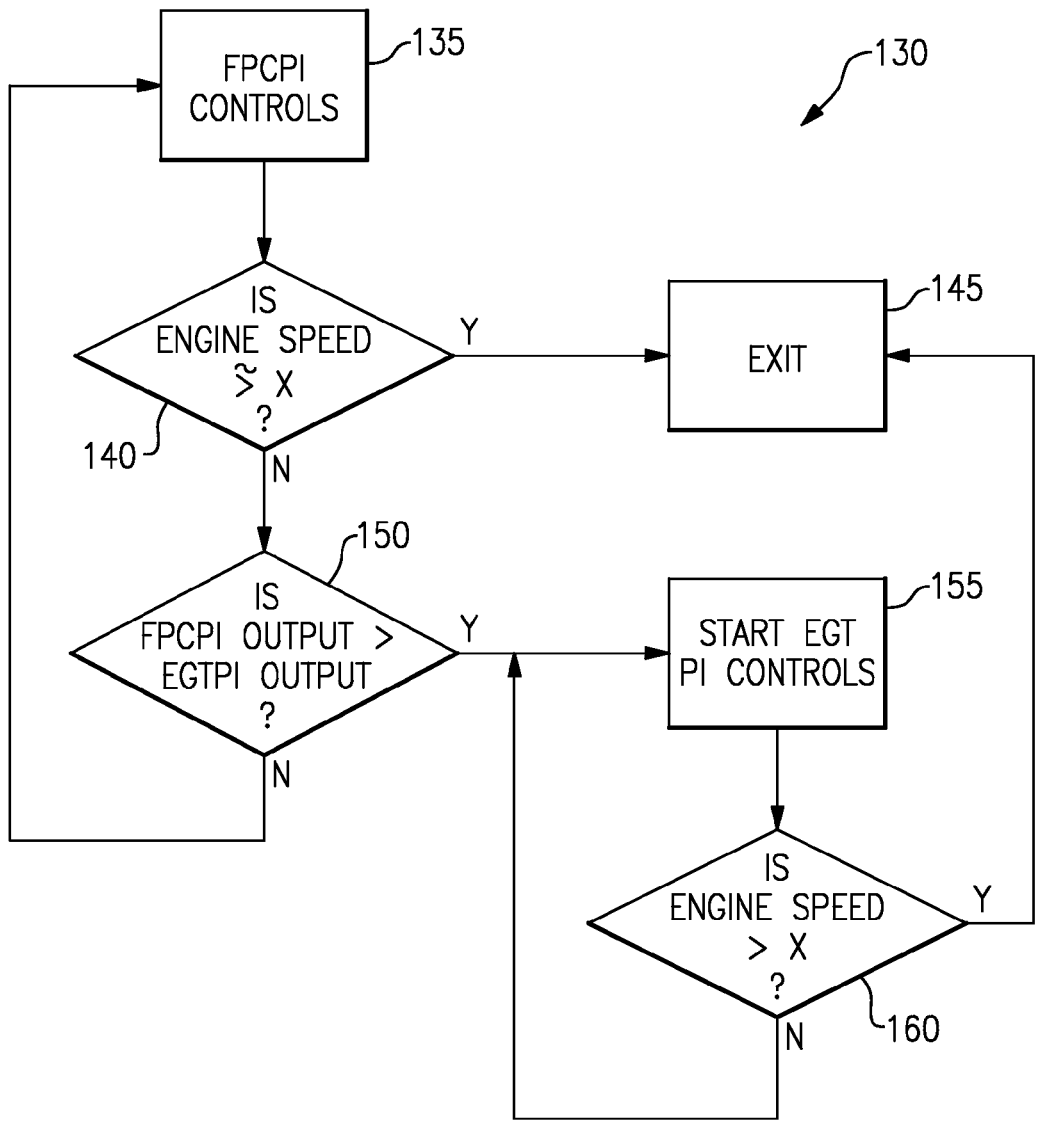
FIG. 3 shows a method of controlling start-up of a gas turbine engine.

Referring now to FIG. 3, a block diagram shows the fuel control method 130 of controller 10 of FIG. 1. As the engine 15 starts, the fuel pressure control PI ("FPCPI") module 80 controls the delivery of fuel to the engine 15 at a pressure determined by a given altitude mode and engine speed (step 135). The control stays with the fuel pressure control PI module 80 until the engine speed approaches, meets, or exceeds a threshold speed, in this instance around 30-35% of rated maximum engine speed. If the latch module 85 determines (step 140) that the engine speed approaches, meets, or exceeds the threshold speed, the controller 10 passes control (or the method 130 exits—step 145) to a separate controller or control module (not shown). If it is determined that the engine speed is lower than the threshold speed and the sensed EGT is not approaching the EGT control limit, the fuel pressure control PI module 80 maintains control of fuel flowing to the engine 15 (steps 140, 150, 135). If it is determined that the engine speed is lower than the threshold speed and the fuel flow command from EGT PI control module 70 (step 150) is lower than the output of fuel pressure PI control module 80, then control is passed by the latch module 85 from the fuel pressure control PI module 80 to the EGT PI control module 70 (step 155). Fuel control then stays with the EGT PI control module 70 until it is determined that the engine speed is higher than the threshold speed (step 160) upon which time control is passed (the method 130 exits—step 145) to a separate controller or control module (not shown).

Since turbine engines are being required to start in more extreme conditions, fuel control metering is critical in meeting the starting requirements of the engine. For example, aircraft are being developed that require gas turbine engines to provide the electric power and/or main engine starting capability on ground and in flight. The flight condition requirements that the engine needs to meet are very extreme for sustaining reliable combustion during starting of gas turbine auxiliary power units, such as cold starting at high altitudes.

The classic method of engine control is to meter fuel flow based on a speed sensor input signal which meters fuel to an engine to maintain a desired acceleration of the engine. This method of fuel flow metering accounts for variables that could affect the starting capability of the engine such as combustor efficiency, fuel module/pump variation, and the drag of varying viscosities of oil at different altitudes. However, predetermined fuel command limits and combustor flame-out limits become narrower as altitude increases and temperature decreases which can cause the classic method of fuel metering not to be precise enough.

As shown herein, as fuel is flowed to the engine 15, the fuel pressure is precisely controlled to maintain a stable combustor flame during the startup. In cases where the fuel pressure control causes the exhaust gas temperature limits to be reached, this new fuel control method is also coupled with an engine exhaust gas temperature ("EGT") topping control which will cut back fuel based on a known EGT schedule.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel control system for controlling fuel to a starting gas turbine engine, said fuel control system comprising:
   a fuel line to the gas turbine engine;
   a fuel pump;
   a fuel injector;
   a sensor sensing supply pressure of fuel to said fuel injector;
   a fuel pressure module configured to produce a first output;
   an exhaust gas temperature module configured to produce a second output; and
   a controller configured to control a flow of fuel to said gas turbine engine with said fuel pressure module, and to pass control of said flow of fuel to said exhaust gas temperature module when said first output is greater than said second output.

2. The fuel control system of claim 1, wherein
   said controller further comprises a set of instructions for responding to a gas turbine engine parameter to pass control of said flow of fuel from said controller.

3. The fuel control system of claim 2 wherein said gas turbine engine parameter is a gas turbine engine speed.

4. The fuel control system of claim 1, further comprising:
   fuel command maximum and minimum limits;
   an exhaust gas temperature limit;
   instructions to said controller to modulate said flow of fuel if an exhaust gas temperature exceeds said exhaust gas temperature limit to lower said exhaust gas temperature below said exhaust gas temperature limit; and
   wherein said instructions further include modulating said flow of fuel between said fuel command maximum and minimum limits.

5. The fuel control system of claim 4, wherein said exhaust gas temperature limit is selected utilizing an altitude and an altitude lookup table.

6. The fuel control system of claim 5, wherein said altitude is about 42,000 feet.

7. The fuel control system of claim 3, wherein said gas turbine engine speed is about 30-35 percent of a rated maximum gas turbine engine speed.

8. The fuel control system of claim 1, wherein said fuel pressure module and said exhaust gas temperature module are feedback control modules.

9. A fuel control method for controlling a flow of fuel to a starting gas turbine engine, said fuel control method comprising:
   determining that the starting gas turbine engine meets an altitude condition;
   controlling the flow of fuel to said starting gas turbine engine with a fuel pressure module;
   comparing a first output from said fuel pressure module with a second output from an exhaust gas temperature module;
   passing control of said flow of fuel from said fuel pressure module to said exhaust gas temperature module when said first output is greater than said second output.

10. The fuel control method of claim 9, further comprising:
    defining fuel command maximum and minimum limits;
    defining an exhaust gas temperature limit; and
    modulating said flow of fuel to said gas turbine engine if an exhaust gas temperature approaches said exhaust gas temperature limit to lower said exhaust gas temperature below said exhaust gas temperature limit, and wherein said flow of fuel is modulated between said fuel command maximum and minimum limits.

11. The fuel control method of claim 10, wherein said exhaust gas temperature limit is selected in part based upon an altitude for the gas turbine engine.

12. The fuel control method as set forth in claim 11, wherein said exhaust gas temperature limit is selected utilizing said altitude and an altitude lookup table.

13. The fuel control method of claim 9, wherein said altitude condition is met when the gas turbine engine is at an altitude of about 42,000 feet.

14. The fuel control method of claim 9 wherein said controlling said flow of fuel to said gas turbine engine further comprises controlling said flow of fuel to a fuel injector.

15. The fuel control method of claim 9, further comprising:
    determining gas turbine engine parameter; and
    passing control of said flow of fuel to said gas turbine engine from said fuel control method if said gas turbine engine parameter is exceeded.

16. The fuel control method of claim 15, wherein said gas turbine engine parameter is a gas turbine engine speed.

17. The fuel control method of claim 16, wherein said gas turbine engine speed is about 30-35 percent of a rated maximum gas turbine engine speed.

18. The fuel control method of claim 9, wherein said fuel pressure module and said exhaust gas temperature module are feedback control modules.

* * * * *

UNITED STATES PATENT AND TRADEMARK OFFICE
CERTIFICATE OF CORRECTION

| | | |
|---|---|---|
| PATENT NO. | : 8,915,088 B2 | Page 1 of 1 |
| APPLICATION NO. | : 12/813627 | |
| DATED | : December 23, 2014 | |
| INVENTOR(S) | : Andre M. Ajami | |

It is certified that error appears in the above-identified patent and that said Letters Patent is hereby corrected as shown below:

IN THE CLAIMS:

In claim 15, column 6, line 41; after "determining" insert --a--

Signed and Sealed this
Twenty-seventh Day of October, 2015

Michelle K. Lee
*Director of the United States Patent and Trademark Office*